United States Patent [19]

Turner

[11] 4,280,730
[45] Jul. 28, 1981

[54] GLARE SHIELD FOR VEHICLE SUN VISOR

[75] Inventor: Joseph D. Turner, Statesville, N.C.

[73] Assignee: Sun Visors, Inc., Mooresville, N.C.

[21] Appl. No.: 66,913

[22] Filed: Aug. 16, 1979

Related U.S. Application Data

[63] Continuation-in-part of Ser. No. 770,806, Feb. 22, 1977, abandoned.

[51] Int. Cl.³ .............................................. B60J 3/02
[52] U.S. Cl. ............................................... 296/97 G
[58] Field of Search .............. 296/97 G, 97 H, 97 F; 160/DIG. 3

[56] References Cited

U.S. PATENT DOCUMENTS

| 3,159,421 | 12/1964 | Samuelson | 296/97 G |
| 3,445,135 | 5/1969 | Masi | 296/97 H |
| 4,090,732 | 5/1978 | Vistitsky | 296/97 G |
| 4,167,287 | 9/1979 | Franklin | 296/97 G |

FOREIGN PATENT DOCUMENTS 2310894 12/1976 France ................................. 296/97 G Primary Examiner—Robert R. Song
Attorney, Agent, or Firm—Bell, Seltzer, Park & Gibson

[57] ABSTRACT

This glare shield includes a first rectangular panel (20) with a pair of spaced-apart spring clips (24) for removably attaching the same to the vehicle sun visor (10). A second rectangular panel (30) is hingedly connected along one edge of the first rectangular panel (20) and may be latched in side-by-side relationship with the first panel or may be lowered into the line of vision of the person seated in the vehicle to protect the eyes from severe glare by the sun. The second panel (30) is of a semi-transparent nature so that it lessens the glaring rays of the sun but does not obscure visual images. Male hinge members (33) and female hinge members (35) are integrally molded with the first panel (20) and the second panel (30) and are arranged so that the second panel (30) may be easily removed from and attached to the first panel (20).

6 Claims, 8 Drawing Figures

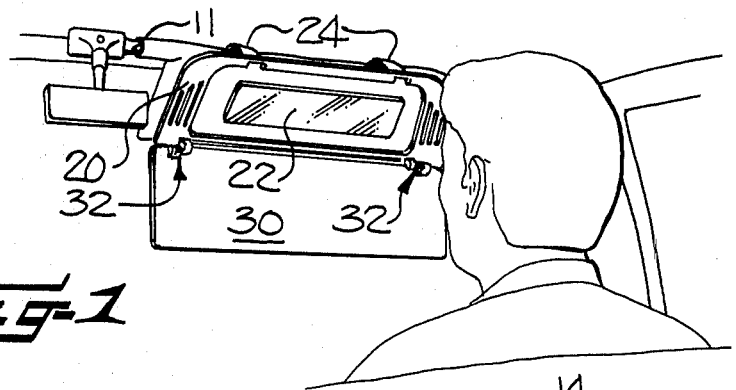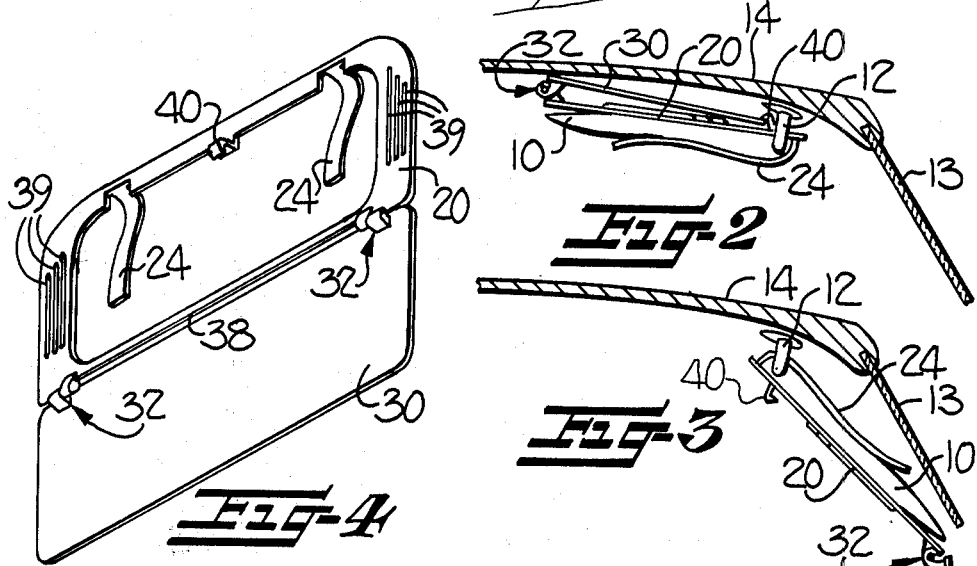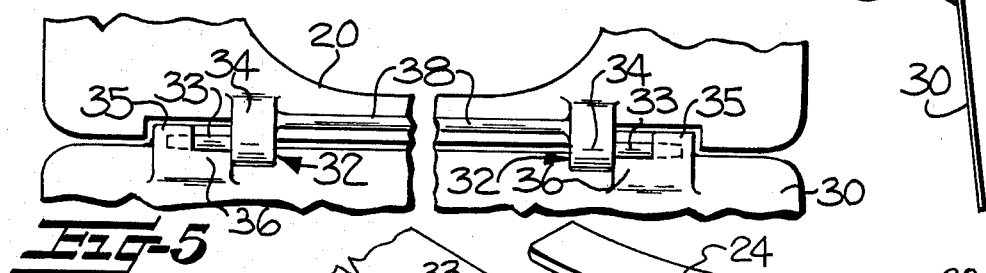

GLARE SHIELD FOR VEHICLE SUN VISOR

FIELD OF THE INVENTION

This application is a continuation-in-part of my copending application Ser. No. 770,806, Feb. 22, 1977, now abandoned, and relates generally to a glare shield for a vehicle sun visor and more particularly to such a device which may be easily removed from and replaced on an existing sun visor to provide an extended glare shield for occupants of the vehicle.

BACKGROUND OF THE INVENTION

Various types of removable and adjustable sun visors have been proposed for use with the conventional sun visor in a vehicle to provide extended coverage below the normal level of the lower edge of the conventional sun visor. However, the prior types of glare shield attachments have not had widespread commercial use and this is believed to be so because these prior attachments have been of a cumbersome and complex nature and have generally required difficult and costly construction.

SUMMARY OF THE INVENTION

With the foregoing in mind, it is an object of the present invention to provide a semi-transparent glare shield which may be easily attached to and removed from a vehicle sun visor, which may be easily and quickly moved between the stored and operative positions to reduce the severe glare of the sun, and which may be economically produced and universally applied to a wide variety of types of existing sun visors.

In accordance with the present invention, the glare shield includes a first molded plastic rectangular panel with widthwise and lengthwise outside dimensions generally corresponding to the respective dimensions of the sun visor and being provided with a pair of spaced-apart and integrally molded spring clips for easy attachment and removal of the glare shield to one side of the sun visor. A second semitransparent molded plastic rectangular panel is hingedly connected to and for easy removal from one edge of the first panel. A cammed spring latch is molded with the first panel and is engaged by the edge of the second panel for selectively maintaining the second panel in side-by-side relationship with the first panel or for releasing the second panel to swing downwardly from the first panel into the line of vision of the person seated in the vehicle.

The hinged connection between the first and second panels comprises a pair of male hinge members integrally molded with opposite end portions and along one edge of one of the panels. A pair of female hinge members is integrally molded with opposite end portions and along one edge of the other panel. The male hinge members extend a short distance into the corresponding female hinge members. This arrangement permits the corresponding edge of one of the panels to be bowed so that the male hinge members can be placed into and removed from the female hinge members and the second panel can be easily assembled with and removed from the first panel for cleaning. The first panel is provided with a central rectangular opening of lesser widthwise and lengthwise dimensions than the outside dimensions so that the first panel may be placed on a sun visor provided with a mirror and the opening will surround the mirror and not obscure the same. Also, the central opening may provide a frame for an advertisement card which may be provided with spaces to record service information. The first rectangular panel may be molded with integral reinforcing ribs in areas around the central opening.

DESCRIPTION OF THE ILLUSTRATED EMBODIMENT

Other objects and advantages of the invention will appear as the description proceeds when taken in connection with the accompanying drawings, in which—

FIG. 1 is a fragmentary perspective view of a portion of the windshield of a vehicle with the glare shield of the present invention attached to the vehicle sun visor;

FIG. 2 is a fragmentary vertical sectional view through a portion of the roof and windshield of the vehicle and showing the present glare shield in stored position above the sun visor;

FIG. 3 is a view similar to FIG. 2 but showing the sun visor in a lowered position and with the second panel of the glare shield in a vertical position;

FIG. 4 is an isometric view of the glare shield, removed from the sun visor, and with the second panel extending vertically below the first panel;

FIG. 5 is an enlarged fragmentary elevational view of the hinge means connecting the two panels together;

FIG. 6 is a fragmentary isometric view of adjacent panels illustrating the hinge in separated condition;

FIG. 7 is a fragmentary isometric view of one of the spring clips and illustrating the manner in which the spring clip is integrally molded with the first panel; and FIG. 8 is a fragmentary isometric view of the cammed spring latch for selectively holding the second panel in upwardly folded condition.

As illustrated in the drawings, the glare shield of the present invention is particularly adapted for use with a conventional type of vehicle sun visor 10 which usually includes a non-transparent rectangular panel hingedly connected along one edge for swinging movement on a pivot rod 11. The pivot rod 11 is usually supported at one end on a pivot bracket 12 for swinging movement between a position with the sun visor in general alignment with the windshield 13 of the automobile and a position with the sun visor in general alignment with a side window adjacent the windshield. As is well known, the sun visor 10 may be moved between a stored position with one side adjacent the roof 14 of the vehicle, as illustrated in FIG. 2, or to an operative position with the sun visor 10 wholly or partly in the line of vision of a person seated in the vehicle, as illustrated in FIG. 3.

The glare shield includes a first rectangular panel 20 of relatively thin and flexible molded plastic material, and having widthwise and lengthwise outside dimensions generally corresponding to the respective dimensions of the sun visor 10. The first rectangular panel 20 is provided with a central rectangular opening 21 of lesser widthwise and lengthwise dimensions than the outside dimensions of the first panel 20 so that when the first panel 20 is placed against and positioned on a sun visor provided with a mirror 22, as illustrated in FIG. 1, the central opening surrounds the mirror 22 so that the mirror is not obscured and may be used by the occupant.

Means is provided for removably attaching the first panel 20 on the side of the sun visor which is positioned adjacent the vehicle roof when the sun visor 10 is in the stored position so that the first panel 20 is positioned with one edge extending adjacent the hinged edge of the sun visor 10 and the other edge extends adjacent the other edge of the sun visor 10. As best shown in FIGS. 4 and 7, the means for removably attaching the first panel to the sun visor 10 comprises a pair of spaced-apart spring clips 24 having slightly outwardly curved free ends and with the other end portions being curved to pass around the sun visor 10 and the ends being integrally molded with the first panel 20. A pair of short and upwardly tapering reinforcing ribs 26 is integrally molded with the first panel 20 and each of the spring clips 24 (FIG. 7).

The glare shield also includes a second rectangular panel 30 which, as best shown in FIG. 2, is of substantially the same length as the first panel 20. The second panel 30 includes a first edge positioned adjacent the first panel 20 and an opposite free edge. The second panel 30 is slightly narrower than the first panel 20 so that the free edge of the second panel 30 is substantially aligned with the inner edge of the opening in the first panel 20 when folded upwardly, for purposes to be presently described. The second panel 30 is formed of a semi-transparent material which is opaque to at least a part of the visual spectrum of light and may be of suitable plastic material, such as a material marketed by General Electric under the name "Lexan." The first panel 20 may also be molded of the same type material.

Hinge means is provided for removably connecting the first edge of the second panel 30 to the adjacent edge of the first panel 20 and includes a pair of spaced-apart hinges, broadly indicated at 32 in FIG. 4. Each of the hinges includes a male hinge pin member 33 fixed to and extending outwardly from a boss 34 integrally molded with the lower edge portion of the first panel 20 (FIGS. 5 and 6) and a female hinge member 35 integrally molded with the edge portion of the second panel 30.

The female hinge member 35 includes an inwardly extending stop member portion 36 which is provided with an arcuate groove 36a which faces upwardly or away from the panel 30. An arcuate groove 37 faces downwardly or toward the panel 30 and the two arcuate grooves 36a, 37 collectively define a cylindrical opening for axially receiving and retaining the associated pin member 33. The inner edge of the stop member portion 36 of each female hinge member 35 is positioned to engage the boss 34 to prevent lateral shifting of the panel 30, relative to the panel 20, when the hinges 32 are in connected condition.

The free end of the male hinge pin member 33 of each hinge 32 faces outwardly and extends along the upwardly facing arcuate groove 36a and a short distance along the downwardly facing arcuate groove 37, as shown in FIG. 5. To disconnect the second panel 30 from the first panel 20, the lower edge of the first panel 20 is bowed upwardly in FIG. 5 and between the hinges 32 to reduce the distance between the outer ends of the male hinge pin members 33 so that the ends of the male hinge members 33 will be free of the female hinge members 35 and the panel 30 may be removed if desired. The downwardly facing arcuate grooves 37 permit the outer ends of the pin members 33 to move downwardly without binding, as the panel 20 is bowed.

The second panel 30 may be connected to the first panel 20 by bowing the lower edge of the first panel 20 and placing the male hinge pin members 33 in the upwardly facing arcuate grooves 36a of the female hinge members 35. As the bowed edge of the first panel 20 is straightened, the outer ends of the male hinge pin members 33 are guided along the upwardly facing arcuate grooves 36a and into the cylindrical openings in the female hinge members 35 and the second panel 30 is hingedly connected to the first panel 20.

The first panel 20 is provided with a reinforcing rib 38 which is integrally molded with the inner surface of the lower edge of the first panel 20 and extends from one male hinge boss 34 to the other (FIGS. 4 and 5). Opposite sides of the first panel 20 are provided with sets of three reinforcing ribs 39 (FIG. 4). The ribs 39 are integrally molded with the inner surface of the first panel 20 and may be engaged by the inner surface opposite sides of the second panel 30 when the second panel 30 is folded up in side-by-side relationship with the first panel 20.

Latch means is associated with the first and second panels 20, 30 for selectively maintaining the second panel 30 in latched side-by-side relationship with the first panel, as illustrated in FIG. 2, or for releasing the second panel 30 to swing downwardly from the first panel 20 and into the line of vision of a person seated in the vehicle when the sun visor 10 is lowered to the operative position, as illustrated in FIG. 3. The latch means comprises a cammed spring latch 40 integrally molded with the upper edge of the central opening in the first panel 20 (FIGS. 4 and 8). The inner portion of the spring latch 40 is provided with a downwardly tapering cam surface 41 which is engaged and moved inwardly by the free edge of the second panel 30 when it is folded upwardly to the stored position. The spring latch 40 then springs inwardly so that the inner portion overlies the free edge of the second panel 30 to hold the same in latched condition. To release the second panel 30 from the spring latch 40, the spring latch 40 is manually moved outwardly from the free edge of the second panel 30 so that the inner portion of the spring latch 40 no longer overlies the free edge of the second panel.

Thus, the glare shield of the present invention may be easily removed from and placed on the sun visor 10 by means of the spring clips 24. When the glare shield is not needed, it may be folded and stored above the sun visor 10, as illustrated in FIG. 2, where it will be readily available when needed. The sun visor 10 may be moved down to the operative position shown in FIG. 3 and the second panel 30 unlatched and moved down to a vertical position to interrupt or lessen the glaring high intensity rays of the sun but will not block visual images and will not obscure the vision of the passenger. Also, the second panel 30 may be easily removed from the first panel 20 for cleaning or for replacement if it is broken or becomes scratched to the point that the vision is obscured.

In the drawings and specification there has been set forth a preferred embodiment of the invention, and although specific terms are employed, they are used in a generic and descriptive sense only and not for purposes of limitation, the scope of the invention being defined in the claims.

That which is claimed is:

1. A glare shield for attachment to a vehicle sun visor of the type including a non-transparent rectangular panel hingedly connected along one edge adjacent the juncture of the vehicle roof and the windshield so that said sun visor may be moved between a stored position with one side adjacent the roof of the vehicle and an operative position with said sun visor wholly or partly in the line of vision of a person seated in said vehicle, said glare shield comprising (a) a first rectangular panel having a length generally corresponding to the length of said sun visor, (b) means carried by said first panel for removably attaching said first panel on the side of said sun visor which is positioned adjacent the vehicle roof when said sun visor is in the stored position, (c) a second rectangular panel being semitransparent and opaque to at least a part of the visual spectrum of light and of substantially the same length as said first panel, said second panel including a first edge and an opposite free edge, (d) hinge means removably connecting said first edge of said second panel to said first panel, said hinge means comprising a pair of spaced-apart hinges, each of said hinges including a male hinge member carried by an edge portion of one of said panels, and a female hinge member carried by an edge portion of the other of said panels, said male hinge member of each of said hinges extending a short distance into the corresponding female hinge member so that one of said panels may be bowed between said spaced-apart hinges to free the ends of said male hinge members from said female hinge members and to free said second panel for removal from said first panel, and (e) latch means associated with said first and second panels for selectively maintaining said second panel in side-by-side relationship with said first panel and for releasing said second panel to swing downwardly from said first panel and into the line of vision of a person seated in said vehicle when said sun visor is lowered to the operative position.

2. A glare shield according to claim 1 wherein said first panel and said second panel are each molded of relatively thin flexible plastic material, and wherein said male hinge members and said female hinge members are integrally molded with said first and second panels.

3. A glare shield according to claim 2 wherein each of said female hinge members includes a first arcuate groove facing in one direction and extending inwardly from one side of said female hinge member, and a second arcuate groove facing in an opposite direction and extending inwardly from the opposite side of said female hinge member, the corresponding inner end portions of said first and second arcuate grooves collectively defining a cylindrical opening for axially receiving and retaining said male hinge member.

4. A glare shield according to claim 1 wherein said means for removably attaching said first panel to said sun visor comprises a pair of spaced-apart spring clips, each of said spring clips being integrally molded at one end with said one edge of said first panel and having outwardly curved free end portions adapted to engage the side of said sun visor opposite the side to which said first panel is attached.

5. A glare shield according to claim 1 wherein said male hinge members are integrally molded with said first panel and face outwardly from each other, and wherein said female hinge members are integrally molded with said second panel and face inwardly toward each other so that the free ends of said male hinge members move out of the corresponding female hinge members when said other edge of said first panel is bowed.

6. A glare shield according to claim 1 wherein said latch means comprises a spring latch integrally molded with said first panel and extending outwardly and inwardly from the central opening therein, a downwardly tapering cam surface on the inner portion of said spring latch for engagement by said free edge of said second panel when moved into side-by-side relationship with said first panel to spring said spring latch outwardly, said spring latch being moved back inwardly so that the inner portion overlies said free edge of said second panel for resiliently maintaining said second panel in side-by-side relationship with said first panel.

* * * * *